United States Patent
Segalov et al.

(10) Patent No.: US 9,467,362 B1
(45) Date of Patent: Oct. 11, 2016

(54) FLOW UTILIZATION METRICS

(71) Applicant: GOOGLE INC., Mountain View, CA (US)

(72) Inventors: Michal Segalov, Tel Aviv (IL); Danny Raz, Timrat (IL); Ariel Shaqed, Tel Aviv (IL)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/217,779

(22) Filed: Mar. 18, 2014

Related U.S. Application Data

(60) Provisional application No. 61/937,811, filed on Feb. 10, 2014.

(51) Int. Cl.
| | | |
|---|---|---|
| *H04L 12/26* | (2006.01) | |
| *H04L 12/803* | (2013.01) | |
| *H04L 12/42* | (2006.01) | |
| *H04L 12/801* | (2013.01) | |
| *H04L 12/24* | (2006.01) | |

(52) U.S. Cl.
CPC ....... *H04L 43/0882* (2013.01); *H04L 43/0829* (2013.01); *H04L 47/125* (2013.01); *H04L 12/2602* (2013.01); *H04L 12/42* (2013.01); *H04L 41/5022* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 7,206,282 B1* | 4/2007 | Goldman | ............... | H04L 47/10 370/230 |
| 8,797,867 B1* | 8/2014 | Chen | .................. | H04L 41/5022 370/232 |
| 8,942,225 B2 | 1/2015 | Hiie et al. | | |
| 9,007,898 B2 | 4/2015 | Jain et al. | | |
| 9,088,510 B2 | 7/2015 | Li et al. | | |
| 2002/0103631 A1 | 8/2002 | Feldmann et al. | | |
| 2002/0141345 A1 | 10/2002 | Szviatovszki et al. | | |
| 2003/0072327 A1 | 4/2003 | Fodor et al. | | |
| 2003/0163593 A1* | 8/2003 | Knightly | ................. | H04L 12/42 709/251 |
| 2005/0201285 A1* | 9/2005 | Simonis | .............. | H04L 12/2602 370/235 |
| 2007/0011741 A1* | 1/2007 | Robert | ................ | H04L 12/2602 726/22 |
| 2007/0280245 A1* | 12/2007 | Rosberg | .................. | H04L 47/10 370/392 |
| 2013/0286846 A1 | 10/2013 | Atlas et al. | | |

OTHER PUBLICATIONS

Barakat, et al, "Modeling Internet Backbone Traffic at the Flow Level", IEEE Transactions on Signal Processing, vol. 51, No. 8, Aug. 2003, 14 pages.
Hassidim, et al, "Network Utilization: the Flow View", 2013 Proceedings IEEE INFOCOM, Apr. 2013, pp. 1429-1437.
US Office Action in U.S. Appl. No. 14/152,548 DTD Jul. 17, 2015.
US Office Action in U.S. Appl. No. 14/152,548 DTD Feb. 2, 2016.

\* cited by examiner

*Primary Examiner* — Vincelas Louis
(74) *Attorney, Agent, or Firm* — McDermott Will & Emery LLP

(57) ABSTRACT

In one general aspect, a method for determining utilization of a network includes calculating a flow value for each of multiple flows in a network, determining a growth factor for each of the flows in the network and determining a utilization of the network using the growth factors for each of the flows. In another general aspect, a method for determining utilization of a network includes calculating a flow value for each of multiple flows in a network and determining a risk factor for each of the flows in the network.

16 Claims, 9 Drawing Sheets

FLOW UTILIZATION METRICS

CROSS REFERENCE TO RELATED APPLICATIONS

This application claims the benefit of U.S. Provisional Application No. 61/937,811, filed Feb. 10, 2014, titled "Flow Utilization Metrics," which is incorporated by reference in its entirety.

TECHNICAL FIELD

This description relates to systems and techniques related to flow utilization metrics.

BACKGROUND

The actual utilization of network resources in a network (e.g., wide area network (WAN) such as a backbone network) is not easy to measure, let alone predict or control. The actual utilization may change quickly in time and in space, and it is hard to draw decisive conclusions by looking on summary statistics. However, hard as it may be, understanding the utilization pattern is a crucial first step when considering ways to optimize a network and is therefore important both from the operations point of view as well as for cost saving.

Traditionally, a main parameter used to describe network utilization is link utilization. For each link, utilization is defined as the amount of traffic traversing the link divided by the link capacity. Since modern networks consist of many links, the (weighted) average of the link utilization is used as a single number representing network utilization. Note that the time frame here may be important since the average utilization of a link over short time periods may be very noisy. For performance management usage, for example, it is common to average link utilization over five minute periods.

While link utilization is one metric and indeed provides meaningful information, link utilization may not always be sufficient. First, examining some percentiles or max link utilization does not provide enough information. It is not clear how to evaluate a given maximal link utilization. What really matters is the link utilization distribution over all the network links and over time.

Second, link utilization does not necessarily reflect network performance, as it is possible and even common for the link utilization to be much lower than the actual traffic, due to built in redundancy (addressing possible failures) and in order to allow flows (demands) to grow. The additional traffic that the network can really accommodate depends on the specific traffic engineering (TE) used as well as on the utilization of links and on the demand pattern. Finally, the link utilization does not tell the story from the client side, and does not describe how any specific user is experiencing the network. Therefore, it is desirable to devise other techniques to measure network utilization.

SUMMARY

According to one general aspect, a method for determining utilization of a network includes calculating a flow value for each of multiple flows in a network, determining a growth factor for each of the flows in the network and determining a utilization of the network using the growth factors for each of the flows.

In another general aspect, an apparatus includes at least one memory that is configured to store instructions and at least one processor that is operably coupled to the at least one memory. The processor is configured to process the instructions to cause the apparatus to calculate a flow value for each of multiple flows in a network, determine a growth factor for each of the flows in the network and determine a utilization of the network using the growth factors for each of the flows.

In another general aspect, a method for determining utilization of a network includes calculating a flow value for each of multiple flows in a network and determining a risk factor for each of the flows in the network.

In another general aspect, an apparatus includes at least one memory that is configured to store instructions and at least one processor that is operably coupled to the at least one memory. The processor is configured to process the instructions to cause the apparatus to calculate a flow value for each of a plurality of flows in a network and determine a risk factor for each of the flows in the network.

The details of one or more implementations are set forth in the accompanying drawings and the description below. Other features will be apparent from the description and drawings, and from the claims.

DETAILED DESCRIPTION

This document describes systems and techniques for measuring network utilization from a flow perspective. In one implementation, a generalized flow utilization (GFU) is used to measure the network utilization, including measuring the network utilization over large networks. The GFU is a quantitative measure for the ability of the TE mechanism to support the current network demand and possible growth (of the same set of demands). GFU may provide a general framework and can be used in different ways depending on the choice of a specific utilization function. For example, in one implementation, GFU may be used as a metric as part of a traffic risk assessment. In another example implementation, GFU may be used as a metric for part of longer term planning and the ability of the network to accommodate growth in flows (demands). A flow includes the routing of traffic from one point in a network to another point in the network. Each path between two points in the network may define a flow. First described below is the GFU followed by more specific instances of the GFU as used to measure flow growth and then as used to measure risk assessment.

Figure 1:
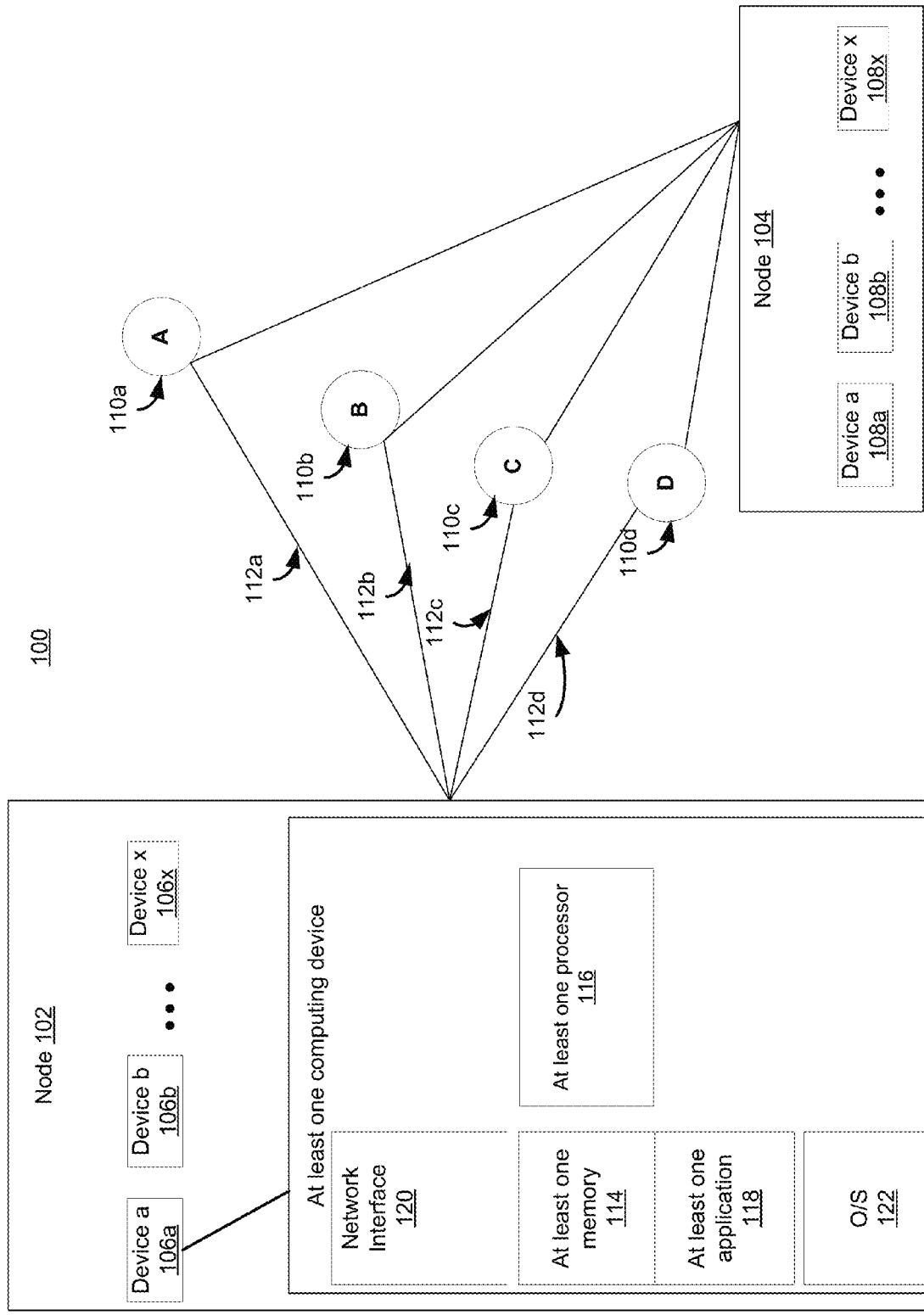
FIG. 1 is a block diagram of a system for measuring flow utilization over a backbone network.

Referring to FIG. 1, a system 100 illustrates an example backbone network. The utilization of backbone networks may be viewed from the aspect of the user (or customer) view, which may be better described by the flow in the network. The backbone utilization of the backbone network may be based by looking at the problem from a flow perspective. In the context of backbone networks, the flows are long lived aggregated entities going from ingress nodes to egress nodes over the backbone. This approach can provide greater insight into the actual performance of the network since it treats the flows as the "basic entities" rather than the links, and uses metrics to measure flow utilization rather than link utilization. One gain from the flow point of view is the ability to distinguish between different types of flow, and give appropriate weight to the more "important" flows. This may be much more complicated to do in a link utilization view, since the same link with its entire capacity serves many flows.

The system 100 illustrates a multi-stage, multipath network environment. The system 100 may be implemented as a wired and/or wireless network or as one system of multiple systems in a wired and/or wireless network In the example of system 100, two nodes are illustrated: a node 102 and a node 104. The node 102 may include multiple devices 106a, 106b . . . 106x. In one example implementation, the node 102 may include thousands of devices 106a, 106b . . . 106x (also notated as 106a-106x). Similarly, the node 104 may include multiple devices 108a, 108b . . . 108x. In one example implementation, the node 104 may include thousands of devices 108a, 108b . . . 108x (also notated as 108a-108x). While only two nodes 102 and 104 are illustrated in this example, the system 100 may include many more nodes that are similar to the nodes 102 and 104. The node 102 may be a network operator.

The devices 106a-106x and the devices 108a-108x may be computing devices. For example, the devices 106a-106x and the devices 108a-108x may be computer servers. The devices 106a-106x and the devices 108a-108x may be any type of computer server. The devices 106a-106x and the devices 108a-108x may include some of the same or similar hardware and software components. Some of the devices 106a-106x and the devices 108a-108x may be configured and/or programmed to perform the same or similar functions and some of the devices 106a-106x and the devices 108a-108x may be configured and/or programmed to execute different applications and perform different functions from each other.

The devices 106a-106x at node 102 may communicate with the devices 108a-108x at node 104. The devices 106a-106x at node 102 may transmit data to and receive data from (e.g., using packets) the devices 108a-108x at node 104. The devices 108a-108x at node 104 may transmit data to and receive data from (e.g., using packets) the devices 106a-106x at node 102. To facilitate communications between the nodes 102 and 104 (and any other nodes in the system), the system 100 may include network components 110a-110d. In one example implementation, the network components 110a-110d may be switches, routers or other similar network equipment. The system 100 also may include multiple paths 112a-112d. The data may be communicated between the node 102 and the node 104 over one or more of the paths 112a-112d through the network components 110a-110d. In this manner, the multiple devices from the nodes 102 and 104 may communicate data using the paths 112a-112d through the network components 110a-110d.

The network components 110a-110d may regulate the data traffic being communicated through them along a path or paths connected to the network component. For example, the network component 110a may regulate the data traffic being communicated through it along the path 112a from node 102 and node 104. The path 112a may be multi-stage having a first segment that provides a communication path between the node 102 and the network component 110a and a second segment that provides a communication path between the node 104 and the network component 110a. Similarly, the other network components 110b-110d may regulate the data traffic along the respective paths 112b-112d.

The device 106a (labelled as at least one computing device) includes at least one memory 114, at least one processor 116, at least one application 118, a network interface 120 and an operating system (O/S) 122. The memory 114 may include a non-transitory computer-readable storage device that is configured to store instructions for execution by the processor 116. The instructions stored in the memory 114, when executed by the processor 116, may cause the computing device 106a to perform certain actions. The processor 116 may be a hardware device, including a microprocessor that is configured to execute the instructions stored in the memory 114. The application 118 may include any type of application capable of running on a computing device. The application 118 may include code that is stored in the memory 114 that, when executed by the processor 116, causes the computing device 106a to perform actions defined by the application 118.

The network interface 120 may be an interface for the computing device 106a to the paths 112a-112d. The network interface 120 may be a hardware device such as, for example, a network interface card (NIC) or any other type of network interface hardware device. The network interface 120 may include a wired and/or a wireless network interface. The network interface 120 may send data to and receive data from other devices such as devices 108a-108n at node 104.

The computing device 106a may transmit packets to other devices on the network such as the devices 108a-108x at the node 104. As illustrated in FIG. 1, there are multiple different paths 112a-112d on which to transmit the packets, any of which connect to the devices 108a-108x at the node 104.

It may be desirable for the network operator 102 to determine metrics to calculate the utilization of the backbone network illustrated in FIG. 1.

The link utilization view summarizes the network state by a vector $u=(u_1, u_2, \ldots, u_n)$, where $u_i$ is the utilization of link i, and n is the number of links in the network. The network utilization is the average of all elements $u_i$ weighted by their capacity. In one example implementation, for a flow utilization view, a vector $\alpha=(\alpha_1, \alpha_2, \ldots, \alpha_m)$ may be used, where $\alpha_i$ represents the state of flow i, and m is the number of flows in the network. There may be various options or objectives when defining this vector and the specific choice of the exact value of $\alpha_i$ will represent a different aspect of the current network or the TE performance state. One aspect is to look at a subset of these vectors, which may be called admissible.

Consider a network with feasible flows $f_1, f_2, \ldots, f_m$; that is, the flows $f_1, f_2, \ldots, f_m$ are routed in the network without violating the capacity constraints. A vector $\alpha_1, \alpha_2, \ldots, \alpha_m$ is admissible if it is possible to route the flows $\alpha_1 f_1, \alpha_2$ $f_2, \ldots, \alpha_m f_m$ together in the network. Clearly, if $\forall i, \alpha_i = 1$ then the vector is admissible. In one implementation, only vectors with $\alpha_i \geq 1$ for every i are considered. In many cases, the TE scheme implies restrictions on the flows (e.g., by dictating that each flow can only use a specific set of paths, or that the ratio between the different paths of the same flow must be fixed). In these cases, the flow $\alpha_1 f_1, \alpha_2 f_2, \ldots, \alpha_m f_m$ may respect these restrictions.

To address presenting the data and presenting a set of parameters (the $\alpha_i$) for each timestamp we define a single parameter, based on the values of $\alpha_i$, that represents the network flow utilization state. Let F be the total flow in the network at a given time, then the Generalized Flow Utilization (GFU) is defined by:

$$GFU = 1/F \sum_{i=1}^{k} f_i U(1/\alpha_i),$$

where U is a nondecreasing utilization function. For $U(x)=x$, this value is the weighted average of $1/\alpha_i$, which is always a number between 0 and 1. The exact meaning of this value depends on the exact set of admissible $\alpha$s.

Given a set of flows, if there is an admissible vector such $\alpha_1, \alpha_2, \ldots, \alpha_m$ such that all $\alpha_i$'s are large, then the network is underutilized.

Figure 2:
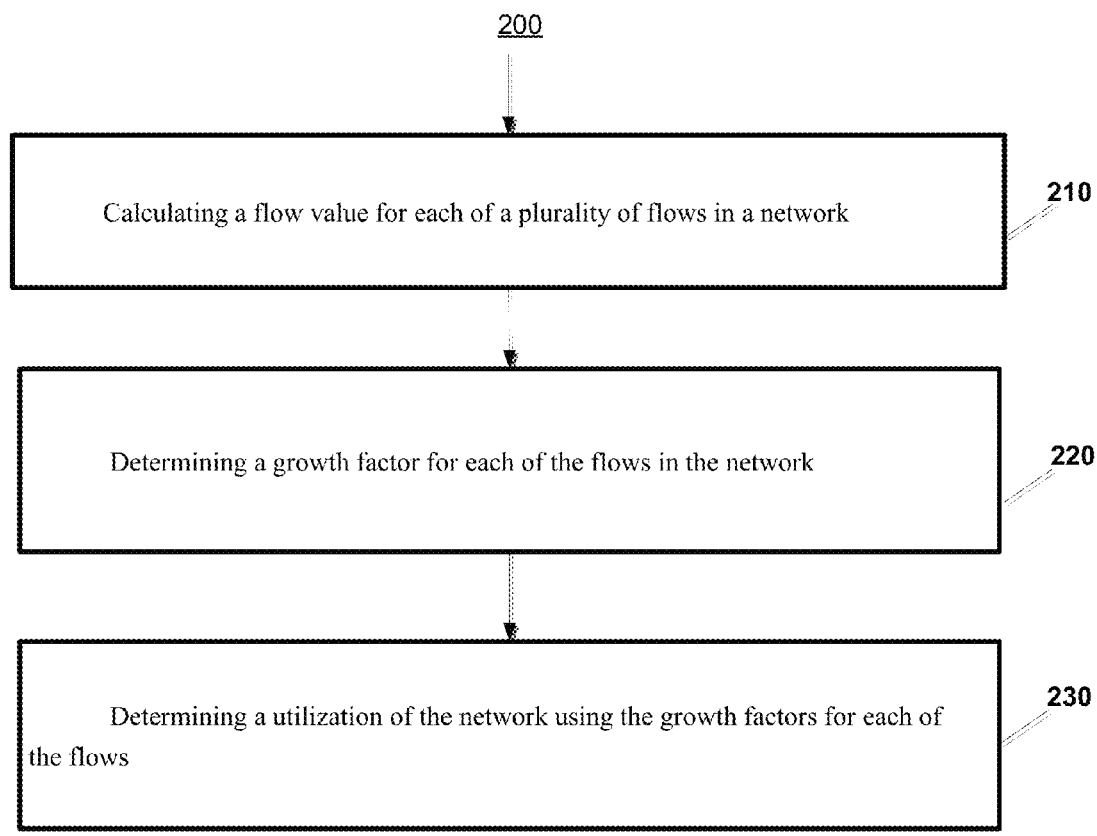
FIG. 2 is a flowchart illustrating example operations of the system of FIG. 1.

Referring to FIG. 2, a process 200 illustrates an example method to determine utilization of a network. Process 200 includes calculating a flow value for each of multiple flows in a network (210), determining a growth factor for each of the flows in the network (220) and determining a utilization of the network using the growth factors for each of the flows (230). For example, process 200 may be implemented by a network operator such as network operator 102 using a computing device such as computing device 106a at one or more various points in the network. In one example implementation, process 200 may be used to determine the utilization of a network including portions of the network that are over-utilized and portions of the network that are under-utilized. The information obtained during the process may be used to make changes to the network including increasing and/or decreasing network capacity as may be appropriate. Various aspects of process 200 are described below in further detail.

In one example implementation, consider a vector of $\alpha_i$ values, which predict the capability of the network to cope with larger demands across the board. As it may not be known a priori which demand will grow the most, one approach is to take a conservative view, and require that the smallest values of $\alpha_i$ will be as large as possible. This vector may be referred to as vector $\alpha^{Growth}$.

Formally, the "max-min-fair" vector $(\alpha_i^{Growth})$ may be defined along with associated sets $b_i$ of blocked flows. Let $\alpha_1^{Growth}$ be the largest factor such that all demands can be increased by $\alpha_1^{Growth}$ and still be satisfied by the network. Now increase all demands by $\alpha_1^{Growth}$, and find the largest constant $\alpha_2^{Growth}$ such that all demands that were not blocked in the previous steps can be increased by a factor $\alpha_2^{Growth}$ and still be satisfied by the network, and continue this to generate $\alpha_i^{Growth}$ in general.

Given demands, an iterative linear programming approach can be used to compute optimal $(\alpha_i^{Growth})$ for all flows. This view is useful for determining the relative performance of existing network TE with the optimum possible unified increase in demand.

In production network backbones, the paths of the flows are determined either by the IP routing protocol or more likely by the TE scheme, and the utopian view that flows can be sent over an unrestricted set of paths may not be realizable. Thus, in order to understand the current behavior of the network, it is useful to compute the vector $(\alpha^{Growth})$ corresponding to the current routing paths of the network flows. That is, all flows can be increased by a factor of $(\alpha_1^{Growth})$ without changing their current paths, all non-blocked flows can be increased by a factor of $(\alpha_2^{Growth})$ without changing the current paths, and so on. There may be multiple, different ways to compute this $\alpha_2^{Growth}$ in an efficient manner: either by first examining flows, or by first examining links.

To compute by examining flows, a sequence $(b_i)$ of the flows blocked at step i may be used. The residual capacity of link l at step i may be defined as $$c_i(l) = c(l) - \sum_{\substack{l \in path(f): \\ \exists j < i: f = b_j}} \alpha_f^{Growth} \cdot f,$$

where $c(l)$ is the capacity of link l and f is the flow value. Similarly, the residual utilization of link l at step i may be defined as $$u_i(l) = \sum_{\substack{l \in path(f): \\ \forall j < i: f \neq b_j}} f.$$

At step i, a growth factor for each flow f may be defined as $$g_{f,i} = \min_{l \in path(f)} \frac{c_i(l)}{u_i(l)}.$$

Select a flow f with minimal $g_{f,i}$, and set $$\alpha_i^{Growth} = \alpha_f^{Growth} = g_{f,i}$$
$$b_i = f$$

Note that in the above process, there is always a link l such that all unblocked flows through l achieve the minimum $g_{f,i}$. This suggests examining the links directly. This is true as long as the network is not saturated.

To compute by examining links, it is useful to define the sequence of $\alpha$ values assigned to links before assigning these values to the flows. Set $B_0 = \emptyset$ and, iteratively for $i = 1, 2, \ldots,$ $$\alpha_i^{Growth} = \min_{l: link} \frac{c(l) - \sum_{\substack{l \in path(f): \\ f \in \bigcup_{j<i} B_j}} \alpha_f^{Growth} f}{\sum_{\substack{l \in path(f): \\ f \notin \bigcup_{j<i} B_j}} f} \quad (1)$$

$$B_i = \{set\ of\ all\ through\ l\ appearing\ above\} \setminus \bigcup_{j<i} B_j \quad (2)$$

Now set $\alpha_f^{Growth} = \alpha_i^{Growth}$ for every flow f where f∈$B_i$.

Computing by links performs fewer operations than computing by flows. In particular, fewer subtractions are needed, and those subtractions can be performed once, before blocking a link and do not affect subsequent comparisons. This reduces floating-point cancellation and stability issues when many flows traverse the same link.

When computing the above process, every flow is blocked exactly once. The per-link values appearing in Equation 1 can be stored in a mutable priority queue. When blocking a flow, all of the links that it traverses in the priority queue must have their priorities updated. Removal of a flow with ≤k links triggers ≤k updates of the priority queue, for complexity O(k·log n) of each flow removal. Accordingly, the complexity for all updates is O(m·k·log n), where there are n flows traversing at most k links each, and m links. The total complexity including initialization is O((n+m·k)·log n).

The order in which links are blocked is also of interest. This order precisely prioritizes the links for procuring additional capacity when max-min-fair TE is employed, or, alternatively, the degree to which such TE is sensitive to congestion along that link when comparable flow patterns exist.

A number of inferences about the network may be inferred by looking at an $\alpha^{Growth}$ vector. For example, many small values (near 1) indicate that the network is over-utilized, and cannot accommodate growth. If the values are consistently large over time, the network is under-utilized, and one can probably serve the clients well with less resources. This may be contrasted with the link utilization view where low average link utilization does not necessarily indicate a waste. The worst situation is when there are both small values and large ones. This means that some of the network cannot grow and may even experience packet loss or delays, while other parts of the network are under-utilized. Moreover, the TE algorithm is unable to use the extra bandwidth it has available in the under-utilized links to better serve the demands which are at risk. This situation calls for an assessment of the TE or the network structure.

The measure $\alpha^{Growth}$ may be used to determine accommodating future demand growth. In another example implementation, the measure discussed below may be tailored for risk assessment and for estimating the current quality of service experienced by clients.

Figure 3:
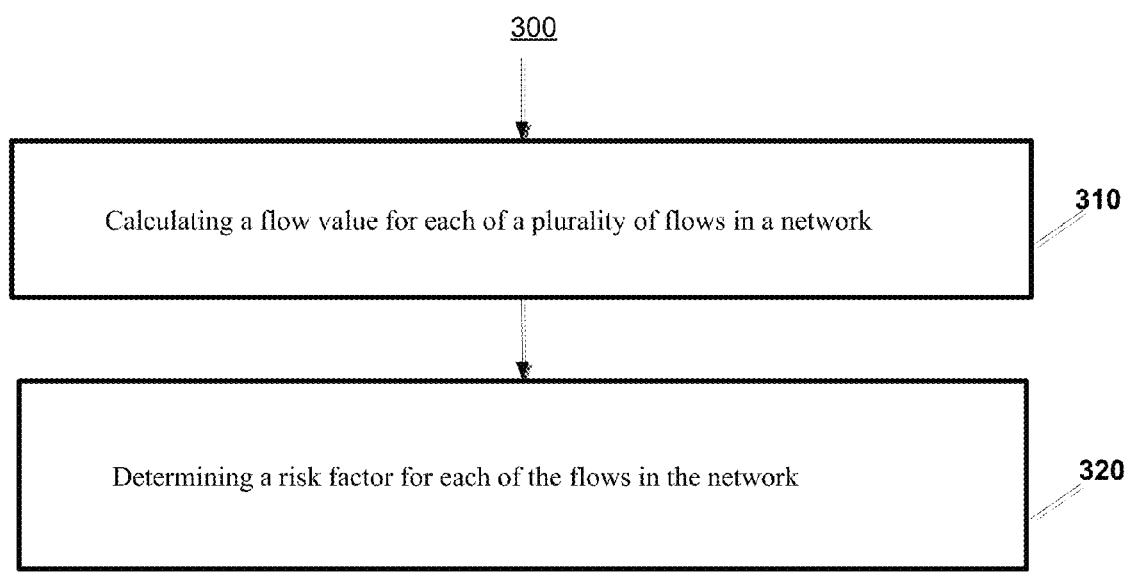
FIG. 3 is a flowchart illustrating example operations of the system of FIG. 1.

Referring to FIG. 3, a process 300 illustrates a flow diagram for determining utilization of a network. Process 300 includes calculating a flow value for each of multiple flows in a network (310) and determining a risk factor for each of the flows in the network (320). For example, process 300 may be implemented by a network operator such as network operator 102 using a computing device such as computing device 106a at one or more various points in the network. In one example implementation, process 300 may be used to determine the utilization of a network including portions of the network that are at risk of breaking. The information obtained during the process may be used to make changes to the network including changing network traffic as may be appropriate. Various aspects of process 300 are described below in further detail.

While the previous definition may be good for capturing an overall network performance score, it is geared towards long term effects and planning. Another aspect includes a focus on the packet loss (and delays) different flows experience in the current network state. Understanding which flows are prone to failures and why is a crucial step in minimizing traffic at risk, which is an important objective for network operators.

Flows are bounded by the most congested link on their path (or paths), so in a way, not all links are equally important. The links that function as actual bottlenecks for certain flows are the ones that have the most critical impact on performance (in terms of delay and loss) and on the network ability to serve more traffic. For simplicity, it may be assumed that each flow has a single path, and later this is expanded to the multi-path scenario.

This sets the ground for another metric capturing the risk of each flow, or in other words, estimating the risk levels for each service or user. This definition may be called $\alpha^{Risk}$ and may be defined formally as follows:

$$\alpha^{Risk}(f_j) = \frac{1}{\max\{util(e_i) \mid e_i \in path(f_j)\}},$$

where c(e) is the capacity of e and $$util(e) = \frac{\sum_{i=1}^{m} f_i(e)}{c(e)}.$$

Directly computing $\alpha^{Risk}$ may be done by, for each flow along a single path the bottleneck link may be found and used to compute $\alpha_i^{Risk}$. This can be done independently for each flow path and thus this computation can be distributed.

Since $\alpha^{Risk}$ is defined in terms of bottleneck utilization independently for each link it first may be shown as being admissible.

To prove $\alpha_i^{Risk}$ is admissible: Let $e_i$ be an edge and let $$\beta = \frac{1}{util(e_i)}.$$

Let $F(e) = \sum_{i=1}^{m} f_i | e \in f_i$ be the total flow over e and let $F'(e)$ be the total flow over e where every flow $f_j$ has been multiplied by $\alpha_j^{Risk}$. Let $f_i' = f_i \alpha_i^{Risk}$ be the utilizations of the individual flows for 1≤i≤m. We will show that $F'(e_i) \le c(e_i)$.

Indeed for all i, $$F'(e_i) = \sum_{f_j \in e_i} f_{j'} = \sum_{f_j \in e_i} \frac{f_j}{\max\{util(e_k) \mid e_k \in path(f_j)\}} \quad (1)$$

$$\le c_i \cdot \sum_{f_j \in e_i} \frac{f_j}{util(e_i)} = c_i. \quad (2)$$

because $e_i$ is one of the links in path($f_j$)

Figure 4:
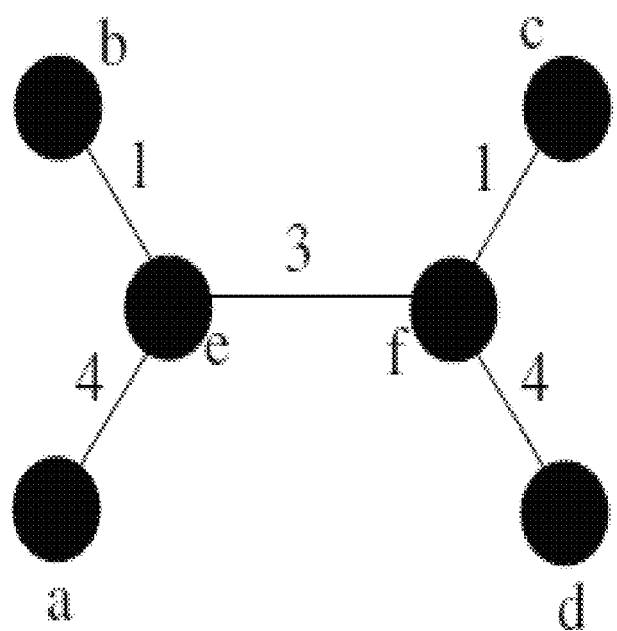
FIG. 4 is a schematic illustrating an example of risk assessment in flow utilization.

$\alpha^{Risk}$ is conservative in the sense that it assumes that all demands grow at once and therefore distributes the residual capacity of each link along all the demands that traverse it. In a way, this is a pessimistic point of view, which goes hand in hand with risk assessments. The flow obtained by multiplying each flow i by $\alpha_i^{Risk}$ is not necessarily maximal, as can be seen in FIG. 4. Two demands are depicted, one from a to d and another from b to c. Both demands send one unit of flow. Link capacities are shown in the figure. We get that $\alpha_{(a,d)}^{Risk} = 3/2$, since the bottleneck edge is (e, f) and has two units of flow on it and a capacity of 3. $\alpha_{(b,c)}^{Risk}=1$, since the bottleneck edge is (b,e) (or (f,c)) and is saturated. If we take each of the flows and multiply by its $\alpha^{Risk}$ we get that f (a–d)=1.5 and f (b–c)=1. Note that this is not a maximal flow in the graph—the flow (a–d) can still be increased. This demonstrates the conservativeness of this definition and is due to the locality of the computation. When computing $\alpha_{(a-d)}^{Risk}$ the other flow was ignored and assumed it is not bottlenecked before (a–d).

Figure 5:
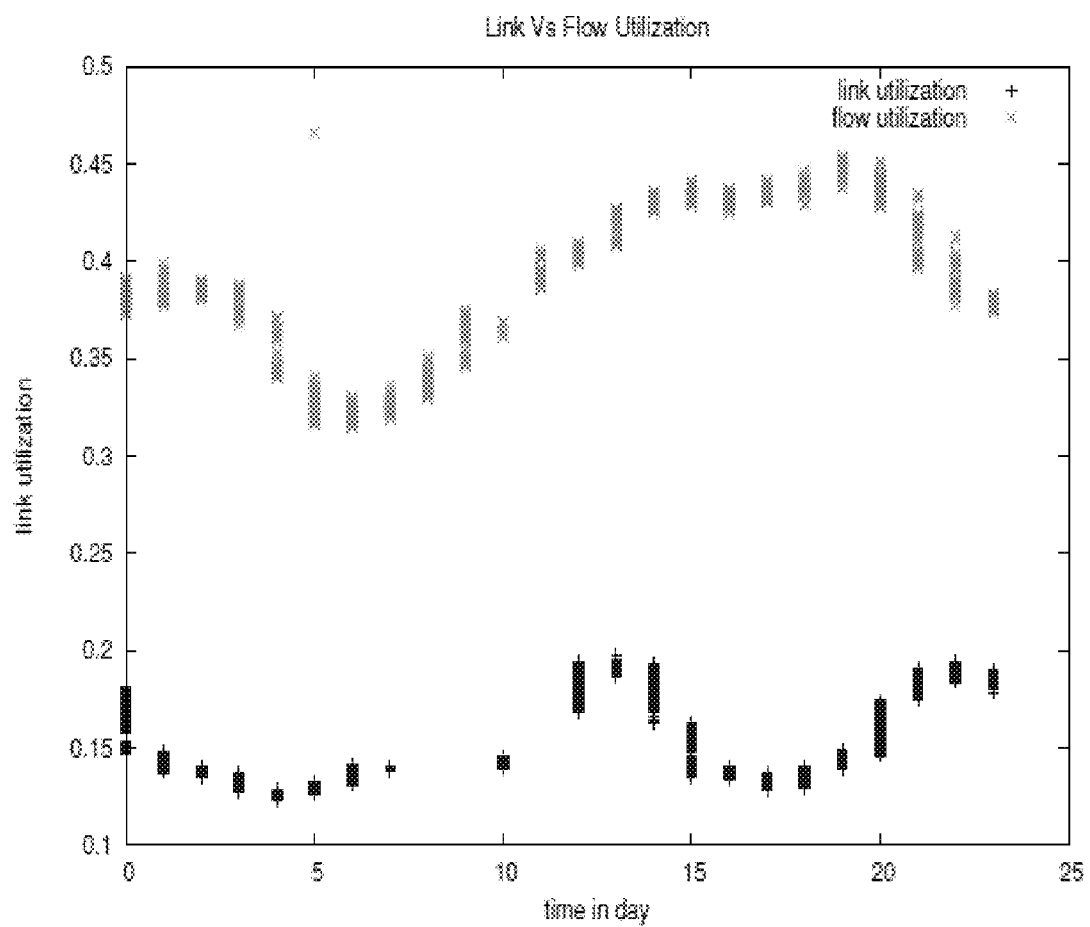
FIG. 5 is a graph illustrating an example comparison of link utilization versus flow utilization.

In one example implementation, flow utilization can be used in practice to provide a better understanding of the network state. FIG. 5 depicts both the link and the flow utilization in an example backbone. The Flow utilization is the Generalized Flow Utilization (GFU) where U(x)=x. The flow and link utilization values were averaged over all the links per timestamp and the timestamps were presented for each hour on the x-point matching that hour. In this case, the flow utilization varies over the day between 40% and 50%, so on average flows go through (fairly high) congested links during peak utilization time during the day. This suggests that the network is in fact much more utilized than indicated by the link utilization curve alone.

Figure 6:
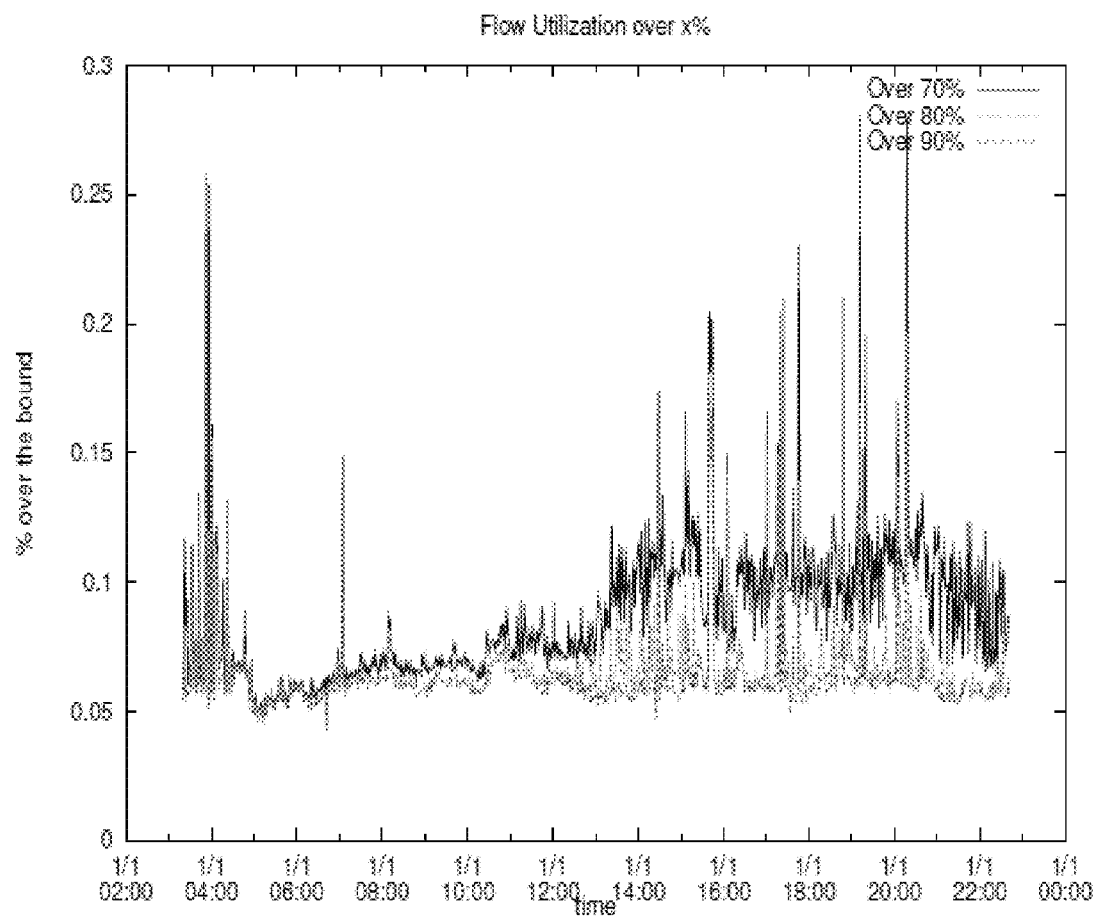
FIG. 6 is a graph illustrating an example of traffic at risk over a period of a day.

In one example implementation, it may be shown how to use different utilization functions. FIG. 6 depicts traffic at risk on the example backbone. Each line corresponds to a different risk level. The x-axis is the time and the y-axis shows the percentage of traffic (out of the total example backbone traffic) that is over the matching risk level. In other words, we can see what percentage of example traffic had $\alpha^{Risk}$ greater than 1.42 (for 70%), 1.25 (for 80%) and 1.11 (for 90%). Since the timescales in which these were computed is rather small, the data varies a lot. Smoothing can easily be applied on this data. During the peak of this day, about 28% of the traffic was at $\alpha^{Risk}$ levels of 1.42, or in other words had bottleneck links that were at least 70% utilized.

So far, we ignored the issue of how multiple paths should be handled. Note that this is not an issue for $\alpha^{Growth}$ since $\alpha^{Growth}$ computes by how much a flow can grow on all of its paths. When there are multiple paths for each flow, we compute for every flow i a vector of numbers $\alpha_{i,j}^{Risk}$ where j is the j-th path for flow i. However, to analyze the quality of service experienced by the client of flow i, it is desired to aggregate this vector into a single number. This can be done in two different ways, depending on what we are trying to model:

1. To estimate the packet loss that flow i experiences due to network contention, it makes sense to take a weighted average of $\alpha_{i,j}^{Risk}$, where the weights are the amount of flow in each path.

2. To estimate the delay which flow i experiences due to network contention, it makes sense to take the maximum, or $\max_j \alpha_{i,j}^{Risk}$.

Figure 7:
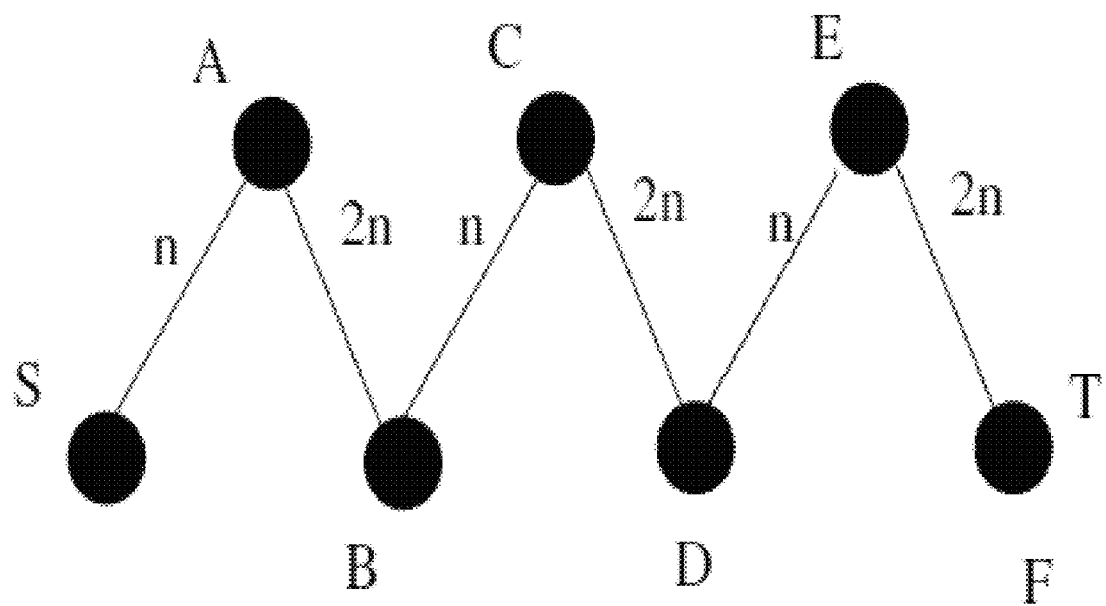
FIG. 7 is a schematic illustrating an example of flow growth and flow risk.

An interesting question is how big is the gap between the two vectors $\alpha^{Growth}$ and $\alpha^{Risk}$. Theoretically, it can be very large as shown in the following example. Specifically, we show a scenario where=(1, n,n,n), while: (1, 2, 2, 2), where n is the number of nodes in the graph of FIG. 7. In this example, there are four flows: S-T, A-B, C-D and E-F. Edge capacities are shown on the graph. S-T is sending n units of flow along the path S-A-B-C-D-E-F-T and is saturated, while the other 3 are sending one unit of flow each on a path (composed of a single edge) of capacity 2n. Each of the edges A→B, C→D, E→F still has available capacity of n-1.

The flow S-T cannot grow, so it has an $\alpha^{Growth}$ of 1. All the other flows can grow by factor n and therefore have an $\alpha^{Growth}$ of n.

The flow S-T cannot grow, so it also has an $\alpha^{Risk}$ of value 1. Once this flow cannot grow further, all the other flows have a bottleneck with two flows traversing it, completing a demand for n+1 on the bottleneck. The $\alpha^{Risk}$ obtained for these flows is 2n/n+1:2. Overall, it is obtained $\alpha^{Growth}=(1, n,n,n)$ while $\alpha^{Risk}\approx(1, 2, 2, 2)$.

In reality the situation is somewhat different. While the two definitions do address different aspect of flow view and are definitely not identical, the gap between them is not so big.

Figure 8:
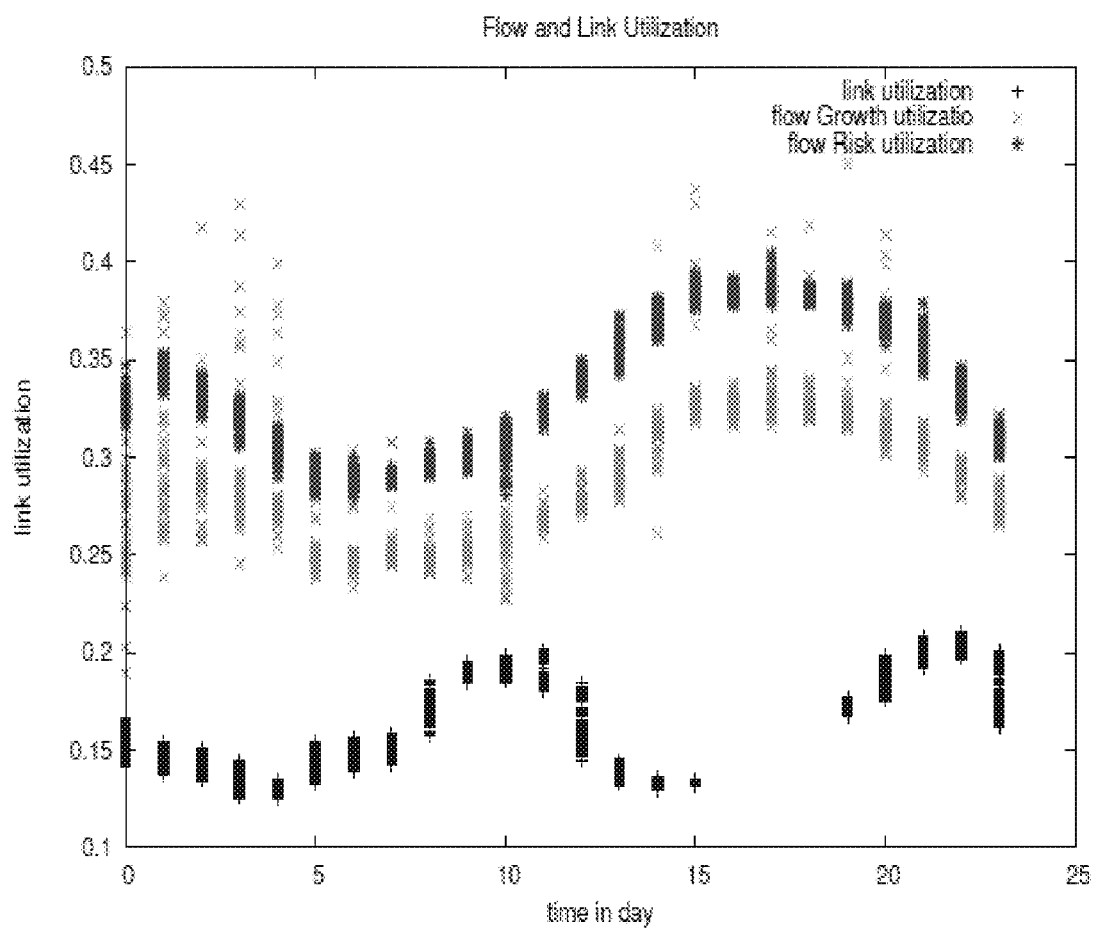
FIG. 8 is a graph illustrating an example comparison of flow growth and flow risk.

FIG. 8 depicts the $\alpha^{Risk}$ $\alpha^{Growth}$ and the link utilization values on the example backbone (over all links and all day). The $\alpha^{Risk}$, $\alpha^{Growth}$ and link utilization values were averaged over all the links per timestamp and presented all the timestamps for each hour on the x-point matching that hour. First, it is expected that $\alpha^{Growth} \leq \alpha^{Risk}$ as $\alpha^{Risk}$ is more conservative. Also, it clearly shown in the figure that both are higher than the link utilization. The daily traffic pattern is shown on all three lines, as expected. The actual network utilization is around 30%-40% according to $\alpha^{Risk}$ and the $\alpha^{Growth}$ is at 25%-33%. On the other hand, the link utilization peaks at 20%. In fact, that network can not grow by a factor of 5 as the link utilization suggests. Under the example network demands and TE scheme the network can only really grow by a factor closer to 2.5.

Figure 9:
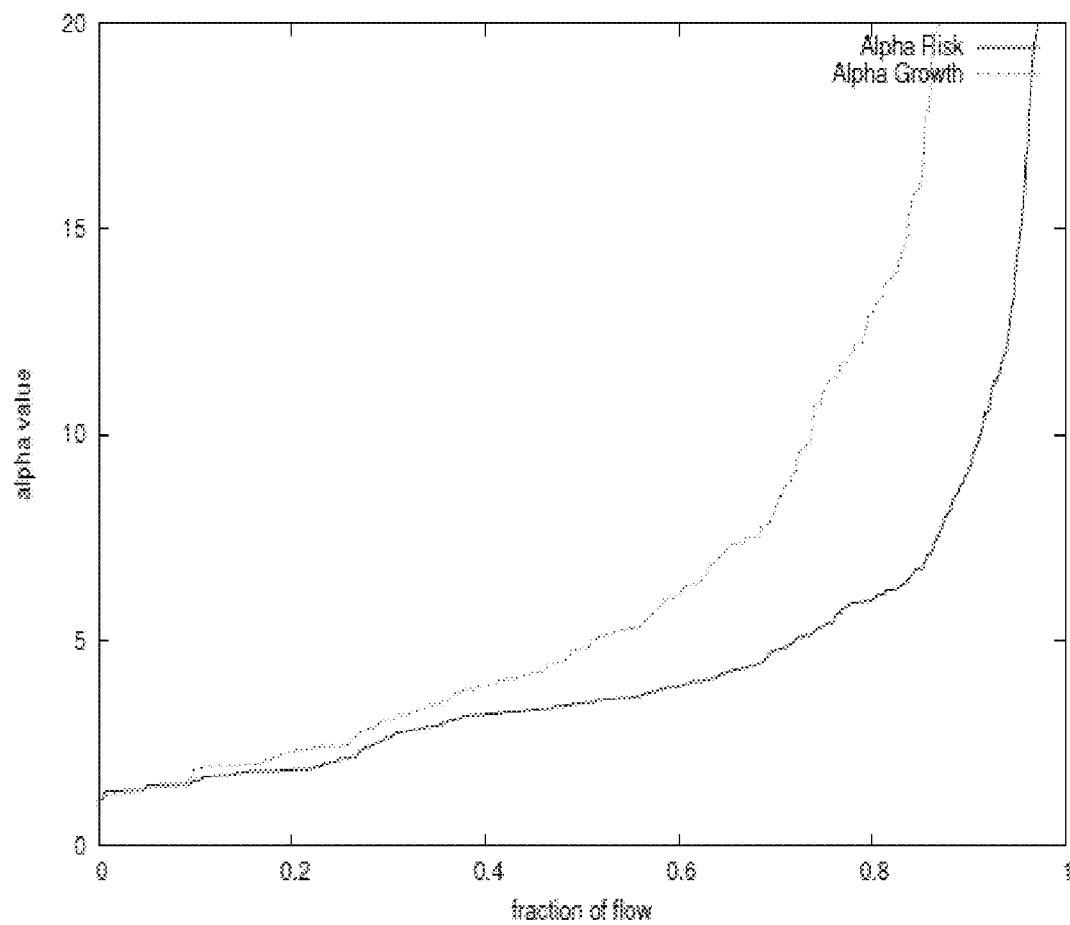
FIG. 9 is a graph illustrating an example of flow growth and flow risk on an example network.

Another interesting view is depicted in FIG. 9, where the $\alpha^{Risk}$ $\alpha^{Growth}$ is illustrated in one specific timestamp. Both values were collected for each link. The x-axis presents the percentage of traffic that has an alpha of at most the matching y-value. Very large alpha values, which occur on links with little or not utilization at this specific timestamp, were left out. About 50% of the traffic has $\alpha^{Growth}$ of at most 5, meaning it cannot grow by a factor greater than 5, compared to 80% of the traffic with $\alpha^{Risk}$ of at most 5. This demonstates the fact that $\alpha^{Risk}$ is in fact riskier. According to it 80% of the traffic is at risk 5 compared to 50% according to $\alpha^{Growth}$.

One can see that the general notion of flow utilization is useful when presenting complex network data. Different aspects like the long term ability to accommodate growth in the demand or the acute risk can be examine and appropriate action can then be taken.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for determining utilization of a network, the method comprising:
    calculating, by a computer processor, a flow value for each of a plurality of flows communicated over the network;
    determining, by the computer processor, a growth factor for each of the flows in the network, wherein determining the growth factor for each of the flows includes iteratively multiplying each of a set of unblocked flows by a same growth factor until a link in one of the flows is blocked; and
    determining by the computer processor, the utilization of the network using the growth factors for each of the flows.

2. The method as in claim 1 wherein determining the utilization includes determining which one or more flows of the plurality of flows are under-utilized.

3. The method as in claim 1 wherein determining the utilization includes determining which one or more flows of the plurality of flows are over-utilized.

4. The method as in claim 1 wherein determining the growth factor comprises first examining the flows in the network.

5. The method as in claim 1 wherein determining the growth factor comprises first examining the links in the network.

6. An apparatus, comprising:
    at least one memory that is configured to store instructions; and
    at least one processor that is operably coupled to the at least one memory and that is configured to process the instructions to cause the apparatus to:
        calculate a flow value for each of a plurality of flows in a network;
        determine a growth factor for each of the flows in the network, wherein determining the growth factor for each of the flows includes iteratively multiplying each of a set of unblocked flows by a same growth factor until a link in one of the flows is blocked; and
        determine a utilization of the network using the growth factors for each of the flows.

7. The apparatus of claim 6 wherein the instructions to cause the apparatus to determine the utilization includes instructions to cause the apparatus to determine which one or more flows of the plurality of flows are under-utilized.

8. The apparatus of claim 6 wherein the instructions to cause the apparatus to determine the utilization includes instructions to cause the apparatus to determine which one or more flows of the plurality of flows are over-utilized.

9. The apparatus of claim 6 wherein the instructions to cause the apparatus to determine the growth factor comprises instructions to cause the apparatus to first examine the flows in the network.

10. The apparatus of claim 6 wherein the instructions to cause the apparatus to determine the growth factor comprises instructions to cause the apparatus to first examine the links in the network.

11. A method for determining utilization of a network, the method comprising:
    calculating, by a computer processor, a flow value for each of a plurality of flows communicated over the network;
    determining, by the computer processor, a risk factor for each of the flows in the network in part by determining a bottleneck link in each of the flows, wherein for at least one flow, the flow traverses at least two paths through the network and determining the risk factor for that at least one flow includes determining bottleneck links along each of the at least two paths; and
    estimating by the computer processor, a packet loss in a flow using the risk factor determined for the flow.

12. The method as in claim 11 wherein determining the bottleneck link includes determining the bottleneck link independently for each flow.

13. The method of claim 11, further comprising, changing network traffic based on the determined risk factors.

14. An apparatus, comprising:
at least one memory that is configured to store instructions; and
at least one processor that is operably coupled to the at least one memory and that is configured to process the instructions to cause the apparatus to:
  calculate a flow value for each of a plurality of flows in a network;
  determine a risk factor for each of the flows in the network in part by determining a bottleneck link in each of the flows, wherein, for at least one flow, the flow traverses at least two paths through the network and determining the risk factor for that at least one flow includes determining bottleneck links along each of the at least two paths and
  estimate a packet loss in a flow using the risk factor determined for the flow.

15. The apparatus of 17 wherein the instructions that cause the apparatus determine the bottleneck link includes instructions that cause the apparatus to determine the bottleneck link independently for each flow.

16. The apparatus of claim 14, further comprising instructions that cause the apparatus to change network traffic based on the determined risk factors.

\* \* \* \* \*